(12) United States Patent
Habibi et al.

(10) Patent No.: US 9,046,428 B2
(45) Date of Patent: Jun. 2, 2015

(54) PRESSURE DETECTION MODULE AND PRESSURE SENSOR DEVICE HAVING SUCH A PRESSURE DETECTION MODULE

(71) Applicants: Masoud Habibi, Schwieberdingen (DE); Markus Reinhard, Kornwestheim (DE)

(72) Inventors: Masoud Habibi, Schwieberdingen (DE); Markus Reinhard, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 164 days.

(21) Appl. No.: 13/926,399

(22) Filed: Jun. 25, 2013

(65) Prior Publication Data

US 2014/0033824 A1 Feb. 6, 2014

(30) Foreign Application Priority Data

Jun. 25, 2012 (DE) .......................... 10 2012 210 752

(51) Int. Cl.
| | |
|---|---|
| *G01L 9/12* | (2006.01) |
| *G01L 9/00* | (2006.01) |
| *G01L 19/00* | (2006.01) |
| *G01L 19/06* | (2006.01) |
| *G01L 19/14* | (2006.01) |

(52) U.S. Cl.
CPC ............. *G01L 9/0073* (2013.01); *G01L 9/0042* (2013.01); *G01L 9/0045* (2013.01); *G01L 9/0052* (2013.01); *G01L 19/0076* (2013.01); *G01L 19/0645* (2013.01); *G01L 19/148* (2013.01)

(58) Field of Classification Search
USPC ...................................................... 73/700–756
See application file for complete search history.

(56) References Cited

U.S. PATENT DOCUMENTS

| 4,930,353 | A | * | 6/1990 | Kato et al. ...................... 73/727 |
| 4,939,497 | A | * | 7/1990 | Nishida et al. ..................... 338/4 |
| 6,070,469 | A | * | 6/2000 | Taniguchi et al. .............. 73/720 |
| 7,152,483 | B2 | | 12/2006 | Mast |
| 2002/0194918 | A1 | * | 12/2002 | Scholz et al. .................... 73/716 |
| 2003/0047991 | A1 | * | 3/2003 | McCurdy et al. ............... 303/11 |
| 2003/0151126 | A1 | * | 8/2003 | Scheurich et al. ............. 257/682 |
| 2006/0023429 | A1 | * | 2/2006 | Ribeiro et al. ................. 361/730 |
| 2006/0209509 | A1 | * | 9/2006 | Hetzer et al. .................. 361/686 |
| 2009/0301212 | A1 | * | 12/2009 | Leiderer ...................... 73/729.2 |

FOREIGN PATENT DOCUMENTS

DE 102 28 000 1/2004

* cited by examiner

*Primary Examiner* — Andre Allen
(74) *Attorney, Agent, or Firm* — Kenyon & Kenyon LLP

(57) ABSTRACT

A pressure detection module of a pressure sensor device includes a receptacle part for receiving a carrier substrate. The carrier substrate is located on a first side with a pressure detection unit, and is inserted into the receptacle part with a second side facing away from the first side. The carrier substrate is fixed with its second side on a base of a receptacle groove. In order to construct the pressure detection module as small as possible, and to manufacture it in a cost-effective way, the receptacle part, the receptacle groove and a peripheral flange around the receptacle groove are, for example, provided with a plate-shaped design. The base has a contacting opening, through which contact surfaces of the carrier substrate, which are exposed at the contacting opening, are electrically contactable.

16 Claims, 6 Drawing Sheets

9,046,428 B2

PRESSURE DETECTION MODULE AND PRESSURE SENSOR DEVICE HAVING SUCH A PRESSURE DETECTION MODULE

CROSS REFERENCE

The present application claims the benefit under 35 U.S.C. §119 of German Patent Application No. DE 102012210752.5 filed on Jun. 25, 2012, which is expressly incorporated herein by reference in its entirety.

FIELD

The present invention relates to a pressure detection module, and a pressure sensor device having a pressure detection module.

BACKGROUND INFORMATION

A pressure sensor device having a pressure detection module is described in German Patent Application No. DE 102 28 000 A1. The pressure sensor device described therein is situated in a housing and uses a pressure sensor, in particular a semiconductor pressure sensor, to detect the pressure. This sensor has a sensor diaphragm, which is provided on the upper side with sensing elements, the central section being spanned on the upper side by the sensor diaphragm. The pressure is supplied to the sensor diaphragm through a recess introduced into the rear side of the semiconductor pressure sensor, which is manufactured by reactive ion etching, for example. The semiconductor pressure sensor is soldered with its recess above a pressure channel of a housing part in such a way that the pressure channel and the recess have a direct pressure connection. The sensing elements on the upper side of the semiconductor pressure sensor generate electrical signals upon the application of pressure, which are relayed via electrical connections (for example, bond wires) to a carrier substrate or directly to contact elements. A cover part closes the pressure sensor device. To determine an absolute pressure with low measuring tolerances with the aid of such a pressure sensor device, it is necessary to maintain a constant pressure, ideally a vacuum, a so-called reference vacuum, in the housing on the non-pressurized side of the semiconductor pressure sensor. Therefore, the electrical signals are conducted outward through hermetically sealed, for example, glazed, contact elements. Manufacturing such a pressure sensor device having a reference vacuum in the housing and implementing the hermetically sealed contact elements requires a comparatively large structural volume of the pressure sensor device; in addition, the manufacturing is complex and the hermetic sealing of the contact elements is linked to high costs.

SUMMARY

An example device in accordance with the present invention may have the advantage that the pressure detection module has smaller dimensions because of its design. If the measuring tolerance is low, contact elements which run outward in a hermetically sealed manner may be omitted, so that the example pressure detection module may be manufactured at low expenditure. The example pressure detection module according to the present invention is usable as a modular component for various applications, whereby costs may also be saved in particular, since a modular and therefore more cost-effective calibration of the pressure detection module is possible before the installation in a pressure sensor device. The pressure detection module may advantageously be fixed in a hermetically sealed way using the flange of its plate-shaped receptacle part on a housing part of a pressure detection device, in particular welded or soldered on.

According to the present invention, an example pressure detection module is provided, the pressure detection module including a receptacle part for receiving a carrier substrate, the carrier substrate being provided on a first side with a pressure detection unit, the carrier substrate being inserted with a second side, which faces away from the first side, into the receptacle part, and the carrier substrate being fixed with its second side, which faces away from the first side, on a base of a receptacle groove. According to the present invention, in the case of the example pressure detection module, the receptacle part including the receptacle groove and a peripheral flange around the receptacle groove has a plate-shaped design and the base has a contacting opening, through which the contact surfaces of the carrier substrate, which are exposed at the contacting opening, are electrically contactable.

The arrangement of the pressure detection unit on the first side of the carrier substrate and the ability to contact the carrier substrate on the second side through a contact opening in the base of the receptacle groove advantageously have the effect that the pressure detection module takes up a particularly advantageously small installation space, and the pressure detection module may be manufactured particularly simply and cost-effectively. The flange particularly advantageously allows sealed fixing of the pressure detection module on a support surface of a pressure detection device, particularly preferably a hermetically sealed fixing by welding.

Advantageous embodiments and refinements of the present invention are made possible by the measures described herein and shown in the figures.

One particularly advantageous specific embodiment of the present invention results in that at least one electrical and/or electronic component is situated on the second side of the carrier substrate. It is thus advantageously made possible to process the electrical signals of the pressure detection unit in the pressure detection module by way of an application-specific integrated circuit (ASIC), for example. The electromagnetic compatibility (EMC) of the pressure detection module may also particularly advantageously be improved by situating passive components (e.g., capacitors) in the vicinity of the pressure detection device and/or the ASIC.

In one particularly advantageous specific embodiment, the receptacle part is designed as a metallic deep-drawn part. The flange of the receptacle part is thus particularly advantageously suited for welding or soldering with a metallic counterpart, so that a sealed connection, particularly advantageously a hermetically sealed connection, may be implemented between the receptacle part and a metallic counterpart.

Because the carrier substrate is a circuit board or a ceramic it is advantageously achieved that the electrical signals of the pressure detection unit and/or of electrical and/or electronic components may be relayed by lines situated on or in the carrier substrate. It is particularly advantageously possible to relay electrical signals from the first side of the carrier substrate to the second side of the carrier substrate through hermetically sealed lines in the carrier substrate. Furthermore, ceramic as the carrier substrate advantageously has a particularly high resistance to aggressive media (for example, exhaust gases having acid and/or basic components in the exhaust system of a motor vehicle or fuels, brake fluid, transmission oil, and the like).

The carrier substrate may advantageously be fastened with the aid of a sealing material, in particular a sealing adhesive or a solder, on the base of the receptacle groove. The sealing material is particularly advantageously a sealing adhesive and the sealing adhesive is applied between the second side of the carrier substrate and the inner side of the receptacle groove in such a way that the contacting opening provided in the base of the receptacle groove is sealed, in particular hermetically sealed, by the sealing adhesive and the carrier substrate. The pressurized chamber is thus particularly advantageously separated in a sealed way, by the sealing adhesive and the carrier substrate, from the chamber which encloses the contacting opening in the receptacle part. Such a refinement of the present invention particularly advantageously causes a media barrier in the pressure sensor module, in that upon application of fluids to the pressure detection device, i.e., liquids and/or gases, in particular aggressive fluids, the attack area of the aggressive fluids remains restricted to the pressure detection chamber.

According to an example embodiment of the present invention, the receptacle part may be closed, using a partition diaphragm on its side opposite to the base, the chamber, delimited by the partition diaphragm and the receptacle part, which is sealed by the carrier substrate and the sealing adhesive against the contacting opening in the base, being filled with a liquid, in particular an oil. This advantageously has the effect that the pressure detection device is only indirectly subjected to the medium whose pressure is to be detected, whereby if the pressure of aggressive media is detected, the service life of the pressure detection module is particularly advantageously lengthened. A closable opening is particularly advantageously provided in the base of the receptacle part in this case, through which the liquid, in particular the oil, may be poured into the chamber delimited by the partition diaphragm and the receptacle part. The manufacture of the pressure sensor module is thus particularly advantageously made easier.

One advantageous refinement of the present invention provides that the pressure detection device includes at least one piezoelectric sensor system applied to the carrier substrate. A semiconductor sensor element is particularly advantageously used for this purpose, since the manufacturing costs are thus particularly low and the pressure detection precision may be kept particularly high. In another advantageous refinement of the present invention, the pressure detection device includes a sensor system having capacitive pressure detection arranged on the carrier substrate. Particularly precise pressure detection is thus advantageously made possible.

Because the carrier substrate is a ceramic substrate having a ceramic main body and a diaphragm situated on the ceramic main body, and the pressure detection unit includes a capacitive sensor system having a first electrically conductive surface situated on the ceramic main body and a second electrically conductive surface situated on the diaphragm, the carrier substrate and the pressure detection unit advantageously form an integrated unit and the manufacturing costs may thus advantageously be reduced. Particularly advantageously, the pressure detection unit is particularly resistant to aggressive media in this refinement of the present invention, for example, exhaust gases, fuels, and oils, since electrical lines may be situated in a media-resistant way in the ceramic main body and may be led to the second side of the carrier substrate, which is not exposed to media.

Because a reference vacuum is enclosed in the pressure detection unit, a pressure detection is thus advantageously made possible with low measuring tolerances and at the same time the structural size of the pressure detection module may particularly advantageously be reduced, since a reference vacuum in the housing may be omitted. Such a pressure detection unit is manufactured particularly advantageously as a semiconductor pressure element in PorSi technology, in the case of which a cavity, which contains the reference vacuum, has a thin diaphragm made of silicon, for example, grown over it in the manufacturing process.

According to the present invention, a pressure sensor device having a pressure detection module according to the present invention may be manufactured in such a way that the pressure sensor device has a housing part, which is provided with a pressure channel and an installation surface enclosing the pressure channel, and a cover part, and the receptacle part of the pressure detection module is installed with the aid of the flange on the support surface of the housing part in such a way that the pressure detection unit directly or indirectly has a pressure connection to the pressure channel. This advantageously has the effect that the pressure detection module may be installed as an integrated component directly at the location at which the pressure is to be measured. The housing part and the cover part may particularly advantageously be designed in a user-specific way, without the pressure detection module having to be changed in design.

Particularly cost-effective manufacturing for various applications is thus made possible.

Because the flange of the receptacle part is connected in a sealed way, in particular connected in a hermetically sealed way, to the housing part by welding, soldering, gluing, and/or by interposing a compressible sealing ring, the pressure sensor device is advantageously also usable for moderate pressure applications (approximately 10 bar to 100 bar). Furthermore, aggressive media, whose pressure is to be determined (e.g., exhaust gases, fuels, transmission oil, and the like), particularly advantageously cannot escape from the interior of the pressure sensor device.

One advantageous refinement of the present invention provides that a cover part electrically contacts the second side of the carrier substrate with the aid of contact elements, the contact elements being electrically conductively connected to plug contacts of the cover part which run outward. Cost-effective and simple installation is thus advantageously made possible. The electrical contacting of the second side of the carrier substrate by spring contacts particularly advantageously causes a tolerance compensation in the case of various operating conditions (in particular in the case of various temperatures) and during the installation and thus advantageously ensures permanent, secure electrical contacting.

Because the cover part has a peripheral collar, which is supported with its end face on the side of the flange facing away from the housing part and which is fastened to the housing part using a crimp connection on a side of the collar facing away from the end face, on the one hand, the cover part is advantageously permanently captively fixed on the housing part and the electrical contacting of the plug contacts with the exposed contact surfaces 208 of the carrier substrate is thus permanently ensured. On the other hand, if a compressible sealing ring (e.g., an O-ring) is used for the seal between the housing part and the receptacle part, permanent sealing compression of the sealing ring is advantageously achieved by the placement of the end face of the collar on the flange of the receptacle part and the subsequent crimp connection.

BRIEF DESCRIPTION OF THE DRAWINGS

Exemplary embodiments of the present invention are shown in the figures and are explained in greater detail below.

FIG. 1b shows a view of the contacting opening in the base of the plate-shaped receptacle element from FIG. 1a.

DETAILED DESCRIPTION OF EXAMPLE EMBODIMENTS

Figure 1A:
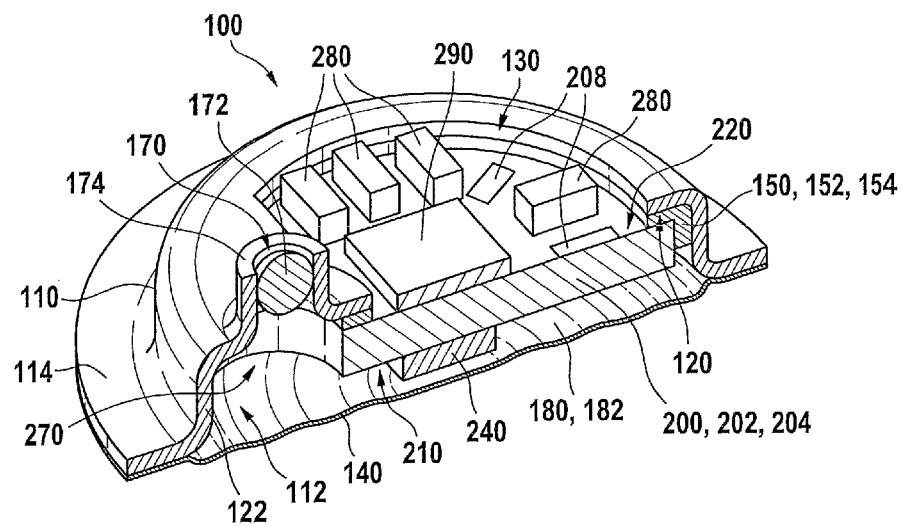
FIG. 1a shows a section through a perspective view of one exemplary embodiment of a pressure detection module according to the present invention.

FIG. 1a shows a section through a perspective view of one exemplary embodiment of a pressure detection module 100 according to the present invention. Such a pressure detection module 100 is suited, for example, for pressure detection in the low-pressure range, for example, in the intake manifold or in the exhaust system of a motor vehicle engine having pressures in the range of approximately 1 bar to approximately 7 bar, for example. Furthermore, such a pressure detection module is also suited for detecting pressures in the moderate pressure range, i.e., from approximately 10 bar to approximately 100 bar, for example, in transmission controller applications. The exemplary embodiment shown in FIG. 1a is particularly suited for detecting pressures of fluids, i.e., gases or liquids, in particular of fluids which have aggressive chemical or mechanical properties. Such fluids are, for example, transmission oils, brake fluids, or exhaust gases which have strong acid or basic components, without being restricted to such fluids. Furthermore, applications outside of automotive engineering are also possible, for example, in air-conditioners, where the pressure detection module may be subjected to fluids in the form of coolants.

FIG. 1a shows a plate-shaped receptacle part 110 having a receptacle groove 112 for a carrier substrate 200 and having a flange 114. Receptacle part 110 has a particularly extensive contacting opening 130 in base 120 of receptacle groove 112. Contacting opening 130 preferably extends coherently over an area in base 120 of receptacle part 110 in such a way that it is possible to contact all exposed contact surfaces 208 of carrier substrate 200 through the one contacting opening 130 using contact elements 710 (not shown here) engaging essentially perpendicularly through contacting opening 130. Contacting opening 130 preferably extends coherently over at least one-sixth of the surface of base 120, particularly preferably over at least one-fourth of the surface of base 120, and very particularly preferably over at least half of the surface of base 120. A partition diaphragm 140, which closes tightly at the flange, extends parallel to flange 114 on the side of receiving part 110 facing away from base 120 of receptacle groove 112. In another refinement of the present invention (not shown here), contacting opening 130 is designed as non-coherent to increase the deflection stiffness. Contacting opening 130 of the exemplary embodiment shown in FIG. 1a is preferably divided by webs in base 120 in this case. In this refinement, in base 120 of receptacle groove 112, preferably only the areas above ASIC 290 and above passive components 280 are designed as an opening, and the areas above contact areas 208 are designed as contacting opening 130.

Plate-shaped is understood as defined in this application as a shape in which receptacle part 110 has an edge area (flange 114), which is situated in a first plane. The edge area encloses a central area, which forms a receiving groove 112, whose base 120 extends in a second plane which is parallel to and spaced apart from the first plane. Receptacle groove 112 may continuously adjoin flange 114 as a U-shaped profile, having side walls 122 which preferably have an inclination in the angular range between 45° and 90° to base 120, particularly preferably an angle between 75° and 90°. Such a plate-shaped design of receiving part 110 may be implemented by a deep drawing process, for example. Receptacle part 110 is preferably made of metal, particularly preferably steel or a steel alloy.

Carrier substrate 200 is a two-layer or multilayer circuit board 202 in the exemplary embodiment shown. It has a first side 210, which faces toward the pressure to be detected and on which a pressure detection unit 240 is situated. Pressure detection unit 240 is preferably designed as a semiconductor pressure sensor using PorSi technology. A cavity is etched into the semiconductor in the PorSi technology, and this cavity has a new surface, a thin diaphragm, made of silicon grown over it under vacuum conditions to form a seal. The sensing elements are finally applied to the new surface. Through this technology, a reference vacuum is already integrated into the semiconductor pressure sensor, whereby these semiconductor pressure sensors may be built particularly small and are thus very cost-effective. The sensing elements are generally designed as piezoresistive or as capacitive elements or structures and convert deformations of the diaphragm caused by a pressure application, and length or distance changes which are thus caused, into electrical signals, which have a functional relationship to the applied pressure.

In the exemplary embodiment, electrical and electronic components, preferably without being restricted thereto, passive components 280, for example, resistors, capacitors (for example, to improve the EMC protection), and the like, and also an ASIC 290 for processing the signals of the pressure detection device and contact surfaces 208, are situated on second side 220 of carrier substrate 200. The electrical signals of pressure detection unit 240 are preferably conducted through hermetically sealed lines in the circuit board (so-called "buried vias") from first side 210 to second side 220.

Carrier substrate 200 is fixed in receptacle part 110 with the aid of a sealing material 150, preferably a sealing adhesive 152 or a solder 154, in such a way that contacting opening 130 and partition diaphragm 140 are separated in a hermetically sealed way from one another. Furthermore, a filling nozzle 174, which has a closable opening 170, is situated in base 120 of receptacle part 110. Through this opening 170 and through a recess 270, which is hermetically sealed against contacting opening 130, in carrier substrate 200, a liquid, preferably a non-compressible, electrically nonconductive liquid, particularly preferably an oil, may be filled into liquid chamber 180, preferably oil chamber 182, of pressure detection module 100. Filling nozzle 174 may preferably be sealed closed after the filling procedure with the aid of a ball 172. However, other closure elements are conceivable, for example, in a cylindrical, conical, elliptical, or disc-shaped design, without being restricted to these embodiments. At least a part of second side 220 of carrier substrate 200 is electrically contactable through contact opening 130 in plate-shaped receptacle part 110.

Figure 1B:
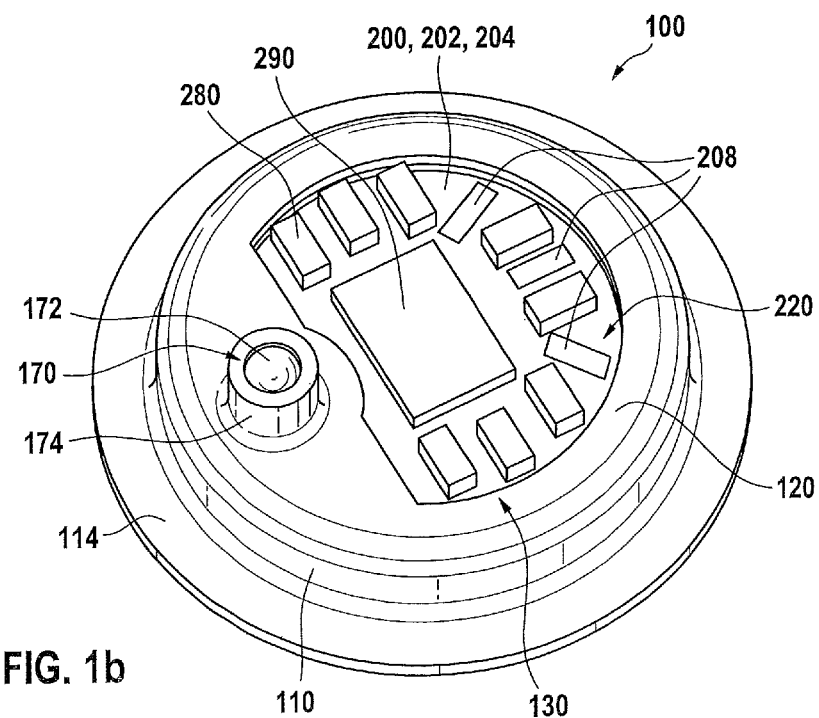

FIG. 1*b* shows a perspective view of contacting opening 130 in base 120 of plate-shaped receptacle element 110 from FIG. 1*a*. The plate shape of receptacle part 110 is apparent particularly clearly. It is well apparent from the design shown that such a pressure detection module may be calibrated particularly simply.

A reference vacuum is preferably integrated into pressure detection unit 240, so that in principle a calibration is already possible after carrier substrate 200 is equipped with pressure detection unit 240 and electrical and/or electronic components 280, 290, which allows a particularly preferable simplification of the manufacturing process. Calibration is understood as a procedure in which the functional relationship between applied pressure and the electrical signals output by the sensing elements of pressure detection unit 240 is detected and the influence of parasitic effects such as temperature is compensated for.

Figure 1C:
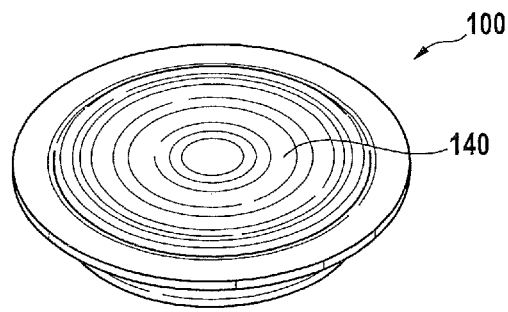
FIG. 1c shows a view of the side of the exemplary embodiment from FIG. 1a which is opposite to the contacting opening in the base.

FIG. 1*c* shows a perspective view of the side of the exemplary embodiment from FIG. 1*a* opposite to base 120, in particular of partition diaphragm 140. In the exemplary embodiment, this diaphragm is made of a thin metal plate, preferably made of steel or a steel alloy. However, other materials are also possible, which are inert and may be attached in a hermetically sealed way on the flange, for example, plastic films, particularly preferably Teflar. Such a plastic film may be fastened in a sealed way on flange 114 by a gluing process or by a thermal process (for example, by laser welding).

Figure 1D:
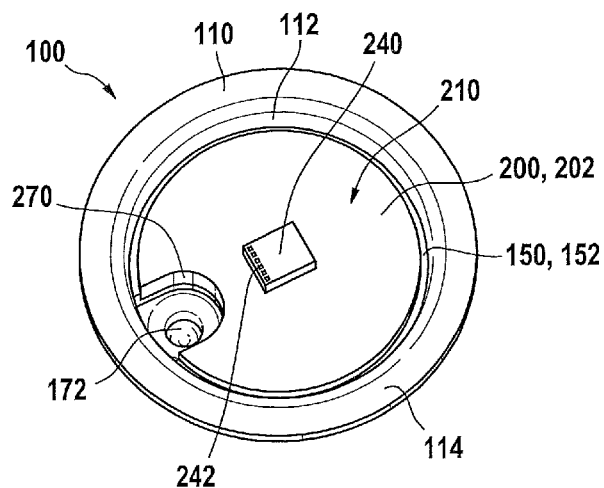
FIG. 1d shows a view according to FIG. 1c without a partition diaphragm, in which the liquid chamber to be filled with liquid is visible.

FIG. 1*d* shows a view according to FIG. 1*c*, in which partition diaphragm 140 was left out, in order to make visible the chamber below partition diaphragm 140, in particular liquid chamber 180 to be filled with liquid. The figure shows pressure detection unit 240 having its contacting surfaces 242 on first side 210 of carrier substrate 200. Recess 270 in carrier substrate 200 is also apparent, through which the non-electrically conductive, incompressible liquid, in particular the oil, may pass from filling nozzle 174 into liquid chamber 180 or oil chamber 182.

Figure 1E:
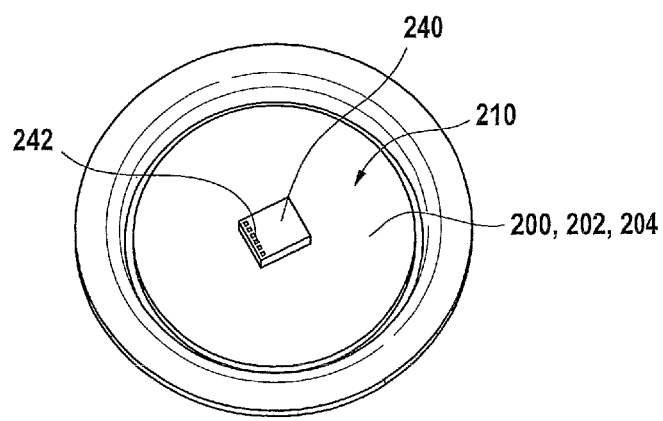
FIG. 1e shows a view of the side of another exemplary embodiment of the present invention opposite to the contacting opening in the base, in which no filling with liquid is provided.

FIG. 1*e* shows a perspective view on the side of another exemplary embodiment of the present invention opposite to contacting opening 130 in base 120. In this exemplary embodiment of pressure detection module 100, no filling with liquid is provided. Such a specific embodiment is particularly preferably suited for low-pressure applications (approximately 1 bar to approximately 7 bar), in particular for gaseous media. In such a refinement of the present invention, pressure detection unit 240 may particularly preferably be designed with contacting surfaces 242 designed as "through silicon vias." In this case, contacting surfaces 242 are on the side of pressure detection unit 240 facing toward carrier substrate 200. The media resistance of pressure detection unit 240 is thus advantageously increased. In such a refinement, the media resistance of the pressure detection unit is particularly preferably increased by introducing a media-resistant material between pressure detection unit 240 and the carrier substrate after the contacting of pressure detection unit 240 on carrier substrate 200.

Rather, pressure detection module 100 is designed here without partition diaphragm 140, without recess 270 in carrier substrate 200, without opening 170, and without filling nozzle 174. In such an exemplary embodiment, the pressure to be detected is applied directly to pressure detection unit 240. Pressure detection unit 240, its contacting surfaces 242, and its electrical contacts to carrier substrate 200 (for example, bond wires (not shown here)), may be protected in such an embodiment against mechanical actions (for example, particles) and against chemical attacks (for example, by aggressive media, for example, acid or basic media) from the applied fluid by the application of a protective layer (not shown here), for example, by a gel or another media resistant coating, preferably a parylene coating, or the like. Such a protective layer lengthens the service life of pressure detection module 100.

In the exemplary embodiment shown, carrier substrate 200 is designed as a circuit board 202; however, it may also be designed as a ceramic substrate 204. The design as a ceramic substrate 204 improves the resistance to aggressive media, for example, if pressure detection module 100 is used in an application in a diesel particulate filter system or in a transmission controller or in a braking system, in which the carrier substrate is subjected to the brake fluid.

Figure 2A:
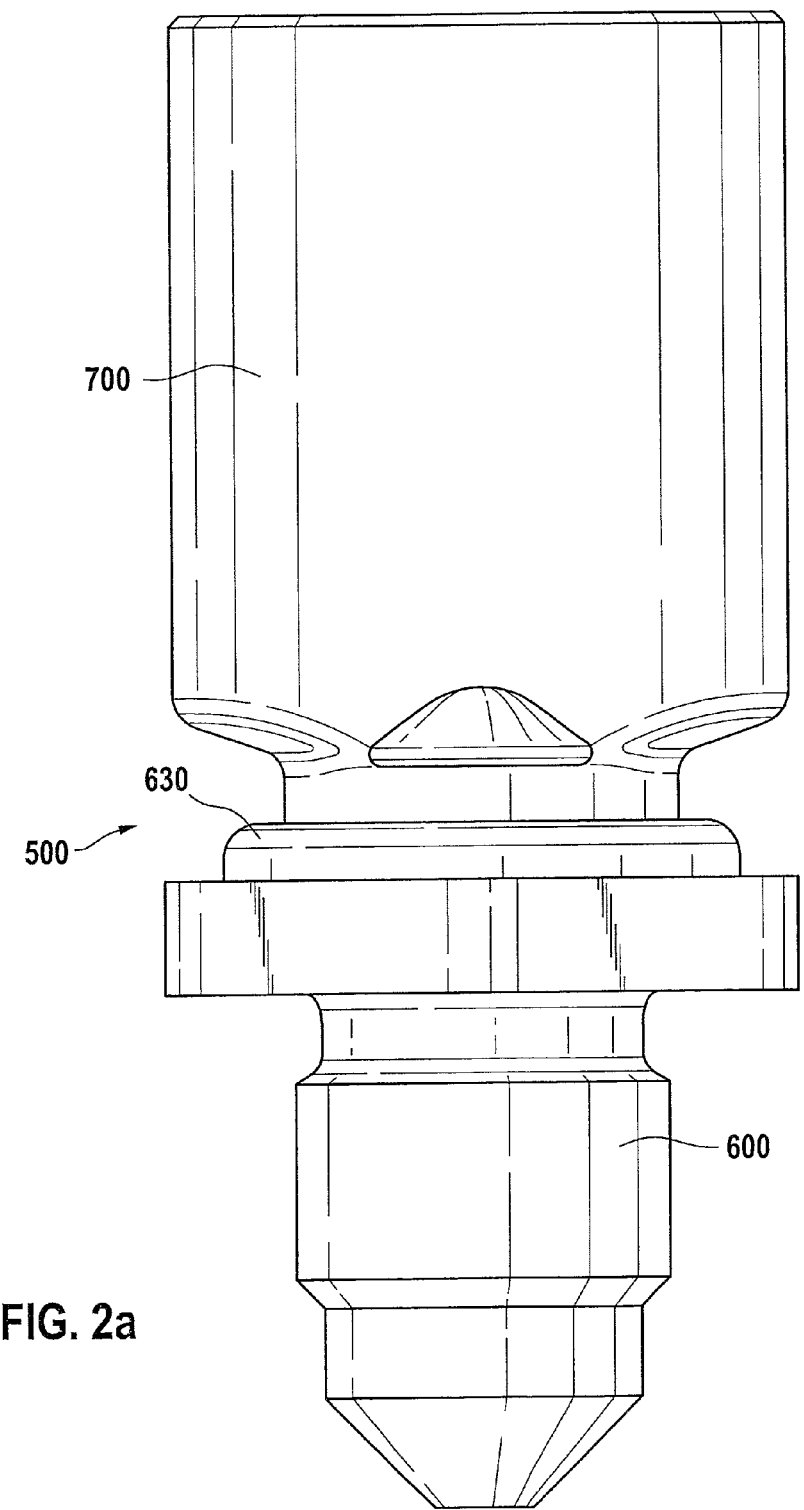
FIG. 2a shows an exterior view of one exemplary embodiment of a pressure sensor device having a housing part and a cover part.

FIG. 2*a* shows an exterior view of an exemplary embodiment of a pressure sensor device 500 having housing part 600 and cover part 700. The mechanical fixing of cover part 700 on housing part 600 takes place by a crimp connection 630 after cover part 700 is placed on housing part 600 and cover part 700 is glued onto housing part 600 with the aid of a cover part sealing adhesive 670.

Figure 2B:
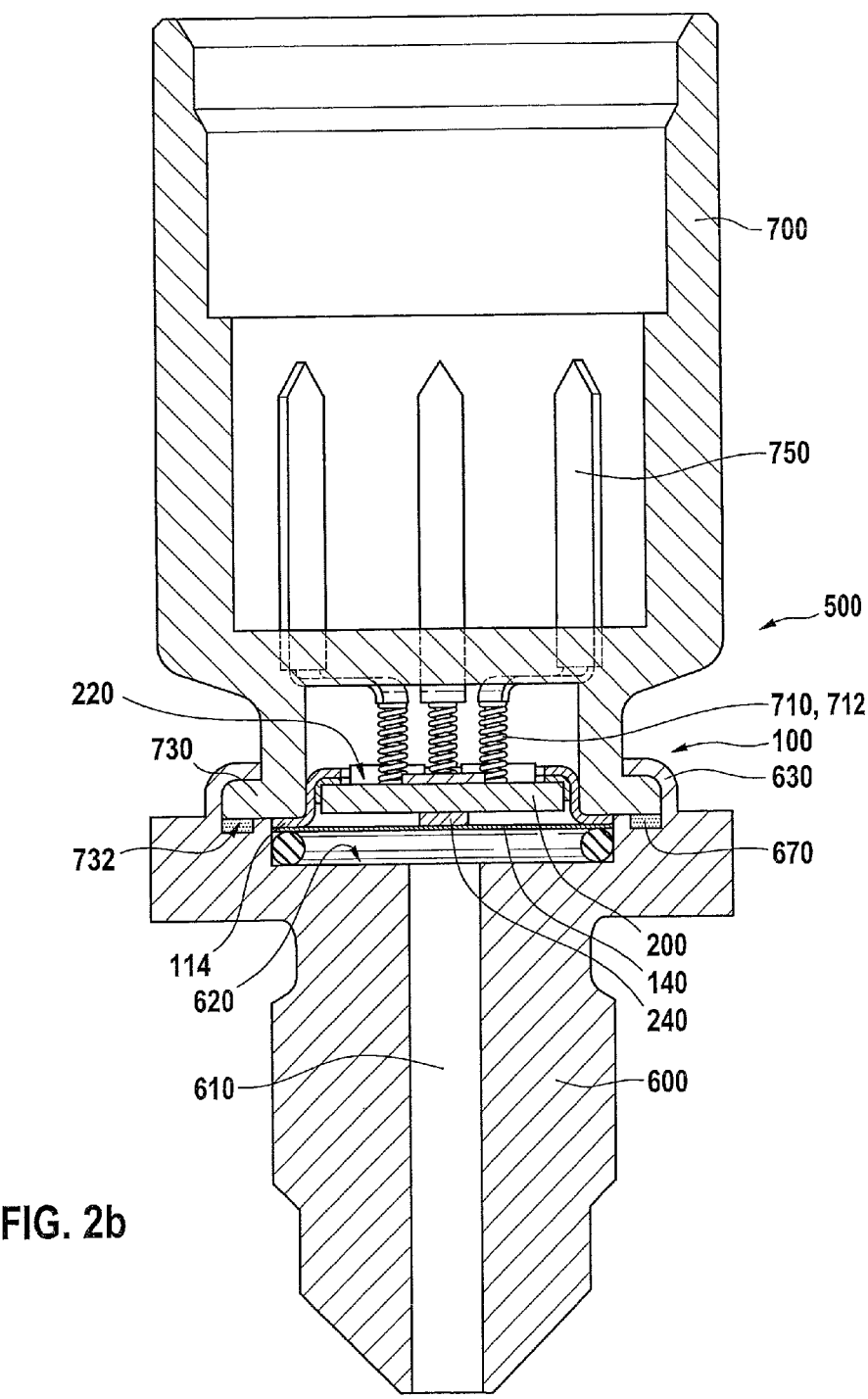
FIG. 2b shows a cross section of one exemplary embodiment of a pressure sensor device according to FIG. 2a having a pressure detection module according to FIG. 1a installed in the pressure sensor device.

FIG. 2*b* shows a cross section of an exemplary embodiment of a pressure sensor device 500 according to FIG. 2*a* having a pressure detection module 100 according to FIG. 1*a* installed in pressure sensor device 500. Pressure sensor device 500 has a housing part 600, which is provided with a pressure channel 610 and a support surface 620 enclosing pressure channel 610, and a cover part 700, in which receptacle part 110 is installed using flange 114 on supporting surface 620 of housing part 600 in such a way that pressure detection unit 240 has a pressure connection, which is indirect in this exemplary embodiment, i.e., separated by partition diaphragm 140, to pressure channel 610. Cover part 700 is placed, after installation of pressure detection module 100, with an end face 732 of a peripheral collar 730 of cover part 700 on housing part 600 and on the side of flange 114 facing away from the housing part. This placement takes place in such a way that plug contacts 750 of cover part 700 make electrical contact with contact surfaces 208, which are situated on second side 220 of carrier substrate 200, via contact elements 710, particularly preferably spring contacts 712, and in this manner the electrical signals of pressure detection module 100 may be tapped. Cover part 700 is glued in a sealed way by a cover part sealing adhesive 670 to housing part 600. Cover part 700 is fixed in a captive and mechanically robust way on housing part 600 by a crimp connection 630 on a side of collar 730 facing away from end face 732.

Figure 2C:
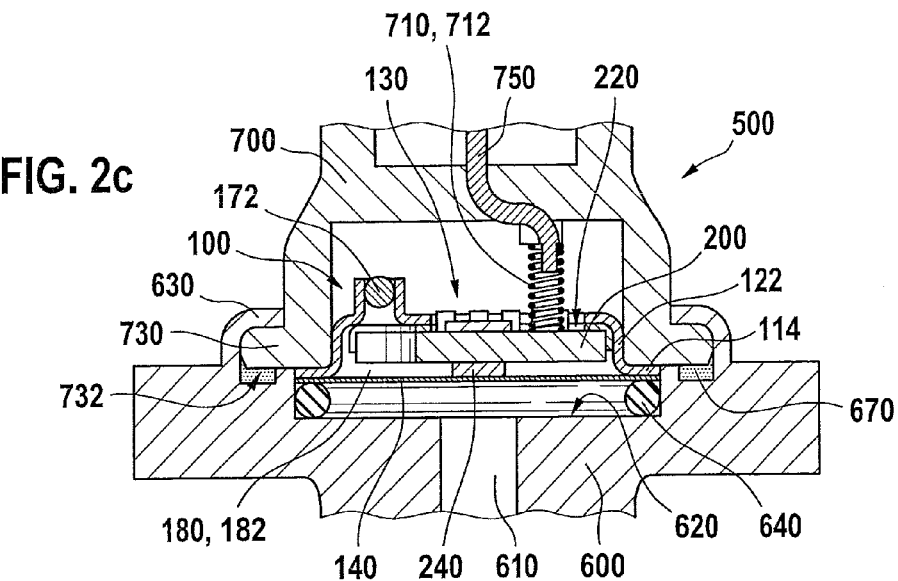
FIG. 2c shows a detail view of FIG. 2b, in which the pressure detection module is fixed with the aid of an O-ring on the housing part.

FIG. 2*c* shows a detail view of FIG. 2*b*, in which pressure detection module 500 is fixed and sealed with the aid of an O-ring 640 on housing part 600. Pressure detection unit 240 thus has a pressure connection to pressure channel 610. Cover part 700 is fastened in a sealed way by a cover part sealing adhesive 670 on supporting surface 620 of housing part 600. The electrical connection of plug contacts 750 of cover part 700 to second side 220 of carrier substrate 200 is established with the aid of contact elements 710, which are fixed in cover part 700, preferably spring contacts 712 (e.g., coiled spring contacts, spiral spring contacts, or, for example, S-shaped leaf spring contacts) through contacting opening 130 in receptacle part 110 of pressure detection module 100. Contact elements 710, preferably spring contacts 712, allow, on the one hand, secure contacting even in the event of different usage conditions, since spring contacts 712 may compensate for temperature-related distance changes due to their pre-tension. On the other hand, spring contacts 712 allow simple installation of the cover element, since during the installation they automatically allow a tolerance compensation in the event of distance tolerances between cover part 700 and second side 220 of the carrier substrate via the spring pre-tension.

Figure 2D:
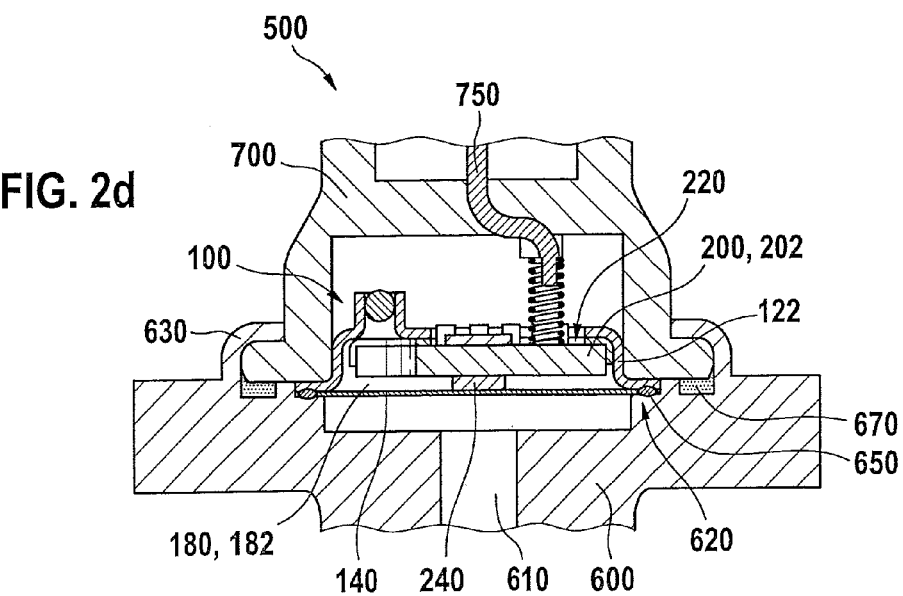
FIG. 2d shows a detail view of another exemplary embodiment of a pressure sensor device, in which the pressure detection module is connected hermetically sealed to the housing part by a welded bond.

FIG. 2d shows a detail view of another exemplary embodiment of a pressure sensor device 500, in which pressure detection module 100 is connected in a hermetically sealed way to housing part 600 by a welded bond 650 between flange 114 and supporting surface 620. It is thus ensured that the fluid applied in pressure channel 610 at the transition between pressure detection module 100 and housing part 600 may not reach areas outside housing part 600. It is also ensured by hermetically sealed welded bond 650 that no media leakage occurs toward second side 220 of carrier substrate 200 over the entire service life and under all operating conditions of pressure detection module 100. In another exemplary embodiment (not shown here) pressure detection module 100, which is welded in a hermetically sealed way onto housing part 600, may also be designed without partition diaphragm 140, so that the pressure is applied directly to pressure detection unit 240. The hermetic seal between flange 114 and supporting surface 620 may also be implemented in other exemplary embodiments by a soldered connection or an adhesive bond.

Figure 3:
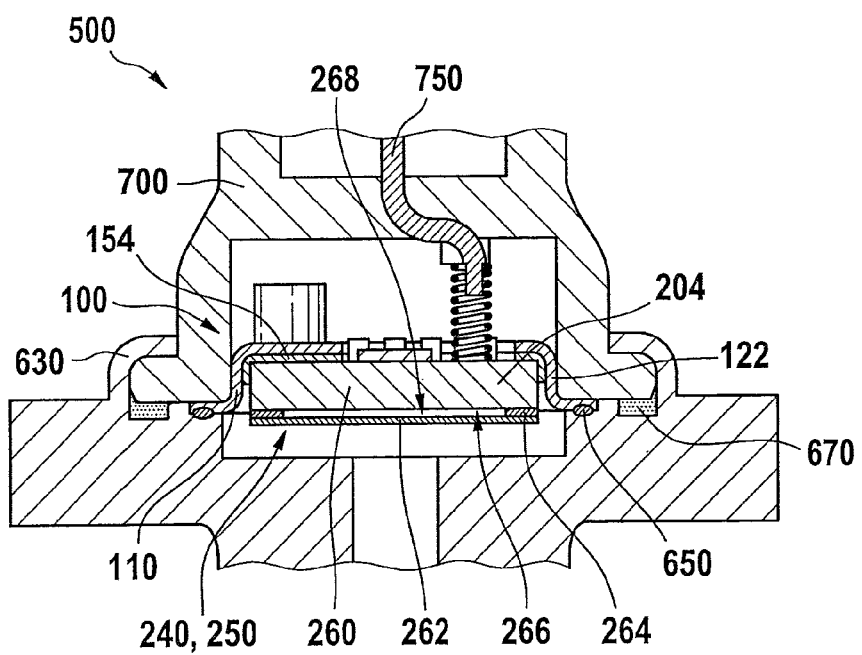
FIG. 3 shows a detail view of another exemplary embodiment of a pressure sensor device, in which the pressure detection device of the pressure detection module is a ceramic pressure sensor.

Finally, FIG. 3 shows a detail view of another exemplary embodiment of a pressure sensor device 500, in which pressure detection unit 240 of pressure detection module 100 is a ceramic pressure sensor 250, in the case of which the pressure detection is preferably performed in a capacitive way. For this purpose, the carrier substrate is designed as a ceramic substrate 204 and is fastened using solder 154 in receptacle groove 112 of receptacle part 110. Ceramic substrate 204 includes a ceramic main body 260 and a diaphragm 262 situated on ceramic main body 260. Pressure detection unit 240 is therefore integrated into the carrier substrate. The carrier substrate, which is designed as a ceramic pressure sensor 250, is a capacitive sensor system having a first electrically conductive surface 266 situated on ceramic main body 260 and having a second electrically conductive surface 268 situated on diaphragm 262. The two electrically conductive surfaces 266, 268 are connected to one another in an electrically nonconductive way by a ceramic solder (glass) 264, and therefore form a type of plate capacitor. A deformation of diaphragm 262 changes the distance between the two electrically conductive surfaces 266, 268, which results in a charge shift, which is detected as an electrical signal on second side 220 of ceramic substrate 204.

What is claimed is:

1. A pressure detection module, comprising:
a receptacle part to receive a carrier substrate, the carrier substrate being provided on a first side with a pressure detection unit, the carrier substrate being inserted with a second side, which faces away from the first side, into the receptacle part, and being fixed with the second side on a base of a receptacle groove, the receptacle part including the receptacle groove and a peripheral flange around the receptacle groove is plate-shaped, and the base has a contacting opening, through which contact surfaces of the carrier substrate, which are exposed at the contacting opening, are electrically contactable.

2. The device as recited in claim 1, wherein at least one of an electrical component and an electronic component, is situated on the second side of the carrier substrate.

3. The device as recited in claim 1, wherein the receptacle part is a metallic deep-drawn part.

4. The device as recited in claim 1, wherein the carrier substrate is one of a circuit board or a ceramic substrate.

5. The device as recited in claim 1, wherein the carrier substrate is fastened with the aid of a sealing material on the base of the receptacle groove, the sealing material being one of a sealing adhesive or a solder.

6. The device as recited in claim 5, wherein the sealing material is the sealing adhesive and the sealing adhesive is applied between the second side of the carrier substrate and an inner side of the receptacle groove in such a way that the contacting opening of the receptacle groove, is hermetically sealed, by the sealing adhesive and the carrier substrate.

7. The device as recited in claim 6, wherein the receptacle part is closed on a side opposite to the base using a partition diaphragm, the chamber, delimited by the partition diaphragm and the receptacle part, which is sealed by the carrier substrate and the sealing adhesive against the contacting opening in the base, is filled using a liquid.

8. The device as recited in claim 7, wherein a closable opening is in the base of the receptacle part, through which the liquid may be filled into the chamber delimited by the partition diaphragm and the receptacle part.

9. The device as recited in claim 1, wherein the pressure detection unit includes a piezoelectric sensor system applied to the carrier substrate.

10. The device as recited in claim 1, wherein the pressure detection unit includes a sensor system having capacitive pressure detection, which is situated on the carrier substrate.

11. The device as recited in claim 10, wherein the carrier substrate is a ceramic substrate having a ceramic main body and a diaphragm situated on the ceramic main body, and the pressure detection unit includes a capacitive sensor system having a first electrically conductive surface situated on the ceramic main body and a second electrically conductive surface situated on the diaphragm.

12. The device as recited in claim 1, wherein a reference vacuum is enclosed in the pressure detection unit.

13. A pressure sensor device, comprising:
a pressure detection module, including a receptacle part to receive a carrier substrate, the carrier substrate being provided on a first side with a pressure detection unit, the carrier substrate being inserted with a second side, which faces away from the first side, into the receptacle part, and the carrier substrate being fixed with the second side, which faces away from the first side, on a base of a receptacle groove, the receptacle part including the receptacle groove and a peripheral flange around the receptacle groove is plate-shaped, and the base has a contacting opening, through which contact surfaces of the carrier substrate, which are exposed at the contacting opening, are electrically contactable;
a housing part which is provided with a pressure channel and an installation surface enclosing the pressure channel; and
a cover part;
wherein the receptacle part of the pressure detection module is installed using the flange on the supporting surface of the housing part in such a way that the pressure detection unit one of directly or indirectly has a pressure connection to the pressure channel.

14. The device as recited in claim 13, wherein the flange of the receptacle part is connected in a hermetically sealed way, to the housing part by one of: welding, soldering, gluing, or by interposing a compressible sealing ring.

15. The device as recited in claim 13, wherein the cover part electrically contacts the second side of the carrier substrate with the aid of contact elements, the contact elements being connected in an electrically conductive way to plug contacts of the cover part which run outward.

16. The device as recited in claim 13, wherein the cover part has a peripheral collar, which is supported with an end face on the side of the flange facing away from the housing part, and which is fastened with the aid of a crimp connection on the housing part on a side of the collar facing away from the end face.

* * * * *